United States Patent [19]

Bellemann et al.

[11] Patent Number: 4,549,961
[45] Date of Patent: Oct. 29, 1985

[54] APPARATUS FOR CLEANING FILTERS IN PRESSURIZED FLUID FLOW SYSTEMS

[75] Inventors: Rudolf Bellemann, St. Leon-Rot; Rolf Diehlmann, Lampertheim; Bela Dobrocsi, Weinheim; Karl F. Wacker, Plankstadt, all of Fed. Rep. of Germany

[73] Assignee: Joh. A. Benckiser Wassertechnik GmbH, Schriesheim, Fed. Rep. of Germany

[21] Appl. No.: 584,099

[22] Filed: Feb. 27, 1984

[30] Foreign Application Priority Data

Mar. 5, 1983 [DE] Fed. Rep. of Germany ....... 3307918
Aug. 13, 1983 [DE] Fed. Rep. of Germany ..... 83108036

[51] Int. Cl.$^4$ ............................................ B01D 29/38
[52] U.S. Cl. .................................... 210/108; 210/111; 210/112; 210/391
[58] Field of Search ............... 210/108, 111, 112, 391, 210/393

[56] References Cited

U.S. PATENT DOCUMENTS 3,853,762 12/1974 Moatti ................................... 210/108
3,994,810 11/1976 Schaeffer ............................ 210/108
4,090,962 5/1978 Braukmann .......................... 210/108
4,271,019 6/1981 Galletti ................................. 210/108
4,295,963 10/1981 Drori ..................................... 210/108

FOREIGN PATENT DOCUMENTS 2338965 2/1974 Fed. Rep. of Germany .
2629151 10/1982 Fed. Rep. of Germany .

Primary Examiner—John Adee
Attorney, Agent, or Firm—Erwin S. Teltscher

[57] ABSTRACT

The reverse flow cleaning process is initiated either automatically by a timing or pressure sensitive device, or manually, by opening an outlet which allows the flow of water, thereby creating a pressure difference. The pressure difference not only creates a reverse flow from the clean to the dirty filter side, but also moves a wiping element having a smaller inlet area than the surface of the filter across the latter surface at a controlled speed. The return of the wiper element to the original position is accomplished either by a spring or hydraulic reset element. Damping is provided to insure that the motion of the wiper is a slow, steady motion. In a special construction, the wiper element consists of a multiplicity of individual elements elastically pressed against the inside, dirty side of a hollow cylindrical filter. The wiper elements are mounted in a piston-like element which moves in response to the pressure difference carrying the wiper elements with it.

19 Claims, 9 Drawing Figures

4,549,961

APPARATUS FOR CLEANING FILTERS IN PRESSURIZED FLUID FLOW SYSTEMS

FIELD OF THE INVENTION

The present invention relates to filter apparatus in pressurized fluid flow systems, and, in particular, for filter apparatus in which the filter element is cleaned by reversing the flow of liquid therethrough. Even more particularly, the apparatus is suitable for connection in water lines which furnish water to buildings.

BACKGROND OF THE INVENTION

Filter apparatus is required to prevent impurities such as particles of sand, iron filings, rust particles, etc. which may be carried in the liquid to reach equipment further down the line and to cause damage in such equipment. Such dirt is deposited on the inlet side of the filter element. As more dirt is deposited on the filter element, the pressure drop across the apparatus increases. Therefore the filter element must be cleaned from time to time by reversing the flow of current through it. The reversal of the flow of current causes the dirt to be loosened from the inlet side of the filter and to be swept into a reverse flow outlet channel which is opened only during the time that the filter cleaning takes place. The higher the water pressure during the reverse flow or cleaning cycle, the better the cleaning effect. On the other hand, the amount of liquid to be used for the cleaning process is to be held to a minimum.

In conventional filter apparatus of the above described type, a cleaning channel element is used whose outlet is connected to the reverse flow outlet channel and whose inlet has a relatively small opening. The cleaning channel element is then moved relative to the surface of the filter so that the small inlet opening passes over the whole surface of the latter. Specifically, the cleaning channel element is passed over the surface of the filter step by step by the turning of a hand wheel, the turning of the wheel also causing a shut-off leading to the reverse flow outlet channel to be opened. This process is relatively cumbersome and cannot be easily automated.

SUMMARY OF THE INVENTION

It is an object of the present invention to furnish filter apparatus cleanable by a reverse flow method in which the reverse flow takes place continuously and is easily controlled either manually or automatically.

In accordance with the present invention, a filter is provided which separates a first, inlet chamber, from a second, outlet chamber. Dirt particles which collect on a first filter surface in contact with the unfiltered water are removed by reverse flow of water from the second chamber to reverse flow inlets positioned adjacent to the first surface and having an inlet area substantially less than the total surface area of the filter. The reverse flow inlets are connected through a pipe to a reverse flow chamber. A reverse flow shut-off is provided which has a first position which allows a reverse water flow through the reverse flow outlet and a second position which stops the flow. When the shut-off means are moved from the second to the first position, a pressure difference is created which causes a reverse water flow from the second chamber through the filter to the reverse flow inlet, the reverse flow chamber and then to the reverse flow outlet. The pressure difference also creates a force acting on the inlets to move the inlets over the first surface of the filter from a first to a second end position, so that the complete filter surface is cleaned. Reset apparatus is also provided to move the inlets back to the first position after the reverse flow shut-off has again been closed.

In a particularly preferred embodiment, the filter element is a webbed tube which is stretched over a cylindrical supporting member having a plurality of through openings and a supporting rib. The inlets are constituted as slots in a wiper, the slots being defined by edges which are radially pressed against the inner surface of the filter to form watertight contacts. The opposite ends of the wiper or wipers are held in a pipe mounted for axial movement relative to the filter. The open bottom end of the pipe extends into the reverse flow chamber. Since the opening of the wiper in contact with the filter extends only over a very small part of the filter surface, the filtering process may be maintained even during the reverse flow cleaning process.

The wiper is preferably constituted by a plurality of wiper elements each having a slot, all arranged around the periphery of the pipe at small distances from one another. The slots form an almost complete circular opening while the spacing permits movement of the individual wiper elements in the radial direction, so that manufacturing tolerances and possible dirt deposits on the filter can be accommodated.

The supporting member for the filter in this embodiment has a helical supporting rib so that the wiper is applied to the filter with constant pressure and therefore constant sliding friction.

The hollow cylindrical pipe carrying the wiper preferably has a closed top so that it constitutes a piston responsive to pressure differences which allow axial movement relative to the filter in two directions.

The end of the pipe which is immersed in the reverse flow chamber carries a sealing element which sits in a seat in the region of the reverse flow outlet. An actuating rod may be provided which is rotatable with respect to the pipe, axially movable with respect to the sealing element and may be manually pushed downward or rotated. The sealing element also has a threaded end which engages a rigidly mounted receptacle in the region of the water-tight seat. Opening and closing of the reverse flow outlet is thus achieved by rotation of the activating rod and is independent of any axial movement of the rod during the reverse flow process. While the pipe and thus the wiper elements moved axially relative to the filter, the latter is subjected to reverse flow from the clean to the dirty side where the wiper inlets touch the filter surface, while at the same time, coarser dirt particles are scrubbed off by the wiper and reach the reverse flow outlet by another route. A damping element is arranged either in the pipe or on the operating rod, so that the axial movement is uniform.

To decrease the internal friction losses as much as possible, it is necessary that the parts which move in an axial direction with respect to one another are precisely concentric. For this purpose, a common headpiece is provided which contains both the inlet for the unfiltered liquid and the outlet for the filtered liquid and which has concentric openings in which the filter element and the filter cup which houses the filtering apparatus are removably mounted.

The novel features which are considered as characteristic of the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
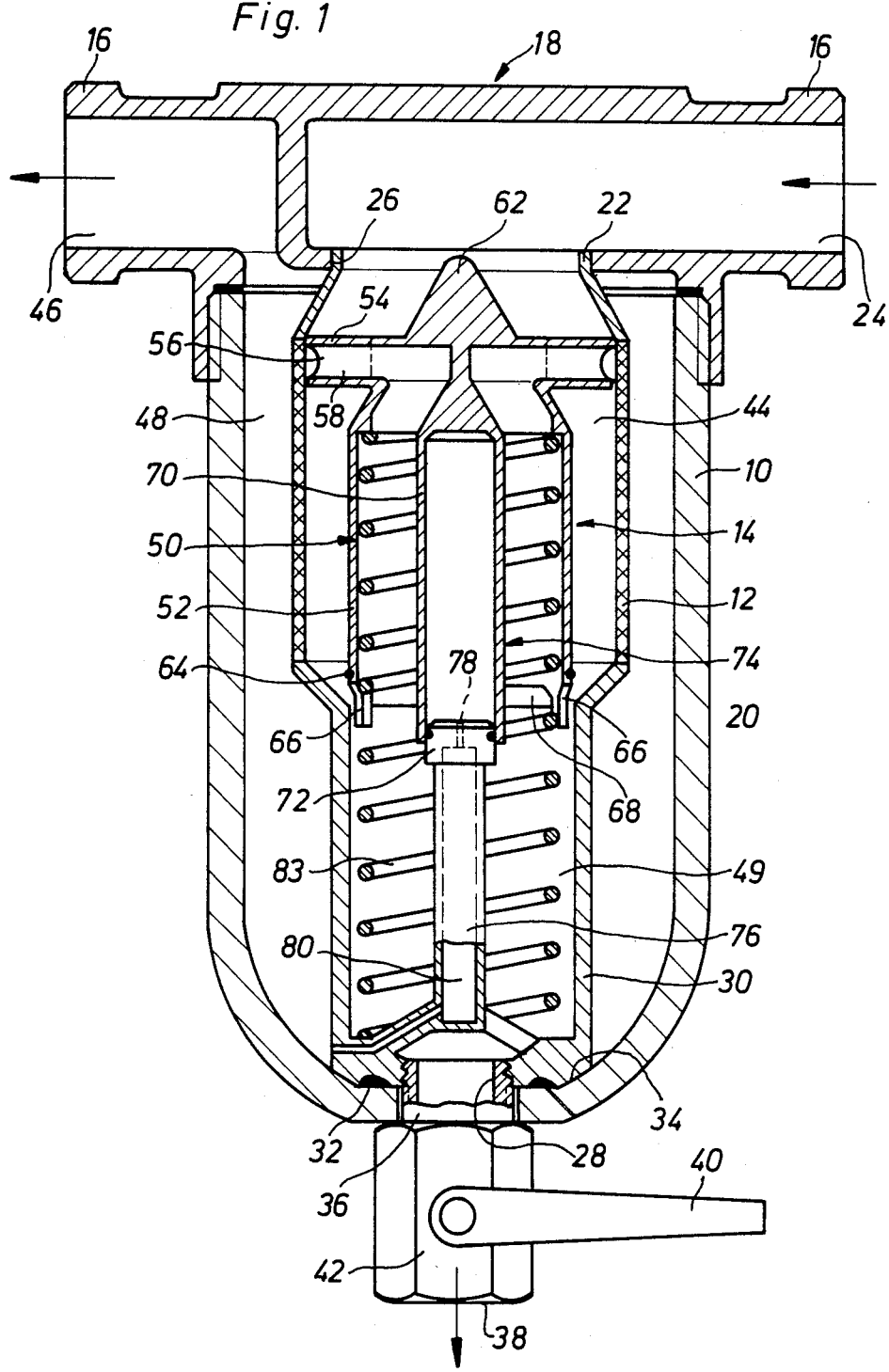
FIGS. 1-4 are vertical cross sections of four embodiments of the present invention.

The filter apparatus shown in the various drawings is designed for connection to water lines, in particular to water lines for use in buildings. It is the object of the apparatus to protect the water lines and any apparatus connected thereto, from impurities and dirt in the water. The apparatus consists mainly of a filter cup 10, a filter 12 inserted in filter cup 10, reverse flow apparatus 14, and a headpiece 18 with pipe connections 16, to which filter cup 10 and filter 12 are fastened.

In the embodiments illustrated in FIGS. 1-5, filter 12 is fastened to a pipe-shaped support 20 made of synthetic material. The upper end 22 of support 20 is inserted in an opening 26 of headpiece 18. Opening 26 opens into unfiltered water inlet 24. The lower end of support 20 consists of a hollow cylinder 30 braced against the bottom 34 of filter cup 10 by a sealing ring 32 and having a bottom opening 28. Bottom opening 28 is connected through a coupling 36 to a pipe connection 38 which is fastened to the bottom 34 of filter cup 10 and leads to the reverse flow outlet channel. A manually operable lever 40 controls a shut-off 42 which is connected to pipe connection 38. Shut-off 42 may consist of a valve, cock or lever. Instead of being manually operable, it could be an automatically operable solenoid operating, for example, on the basis of a timing or pressure difference control.

A filter 12 divides the inside of filter cup 10 into two separate chambers, namely an inlet chamber 44 inside of filter 12 and a filtered water chamber 48 connected to filtered water outlet 46 external to filter 12.

During the filtering operation, the inlet water passes through inlet 24 into inlet chamber 44, flows through filter 12 from the inside towards the outside and finally flows in a filtered state through outlet 46. Any particles suspended in the inlet water are held back by the inner surface of the filter. Coarser particles sink downward into a reverse flow chamber 49 defined by hollow cylinder 30. As more dirt is deposited on the filter, the pressure difference across the equipment increases. Therefore filter 12 must be cleaned from time to time by a reverse flow process. This is accomplished by the reverse flow apparatus 14 internal to filter 12.

Reverse flow apparatus 14 consists of a channel piece 50 which is axially movable relative to filter 12. Channel piece 50 consists of a piece of open pipe 52 insertable into hollow cylinder 30 and at least one toroidal channel 54 which is open over its whole periphery towards filter 12 and projects radially over the pipe jacket. Opening 56 of ring channel 54 can be made to pass over all of the surface of filter 12 on the inlet side by axial movement of channel piece 50. Ring channel 54 and pipe 52 are connected by a plurality of radial channels 58 which are arranged at predetermined angular intervals to one another, spaces 60 between the channels allowing water to flow from inlet 24 to filter 12. A cone-shaped flow distributor 62 whose top points towards inlet 24 equalizes the flow over the filter surface.

Figure 2:
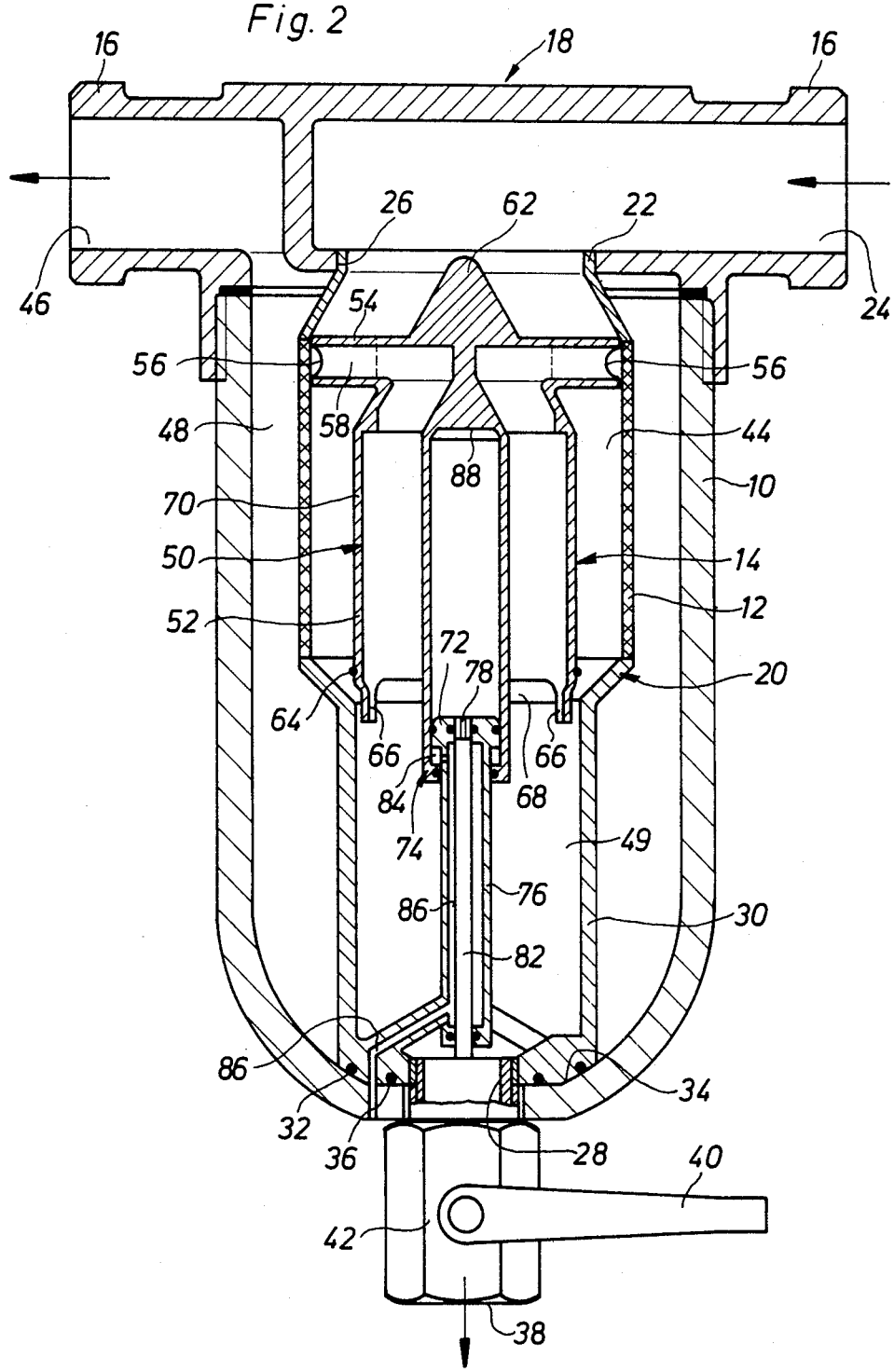
Figure 3:
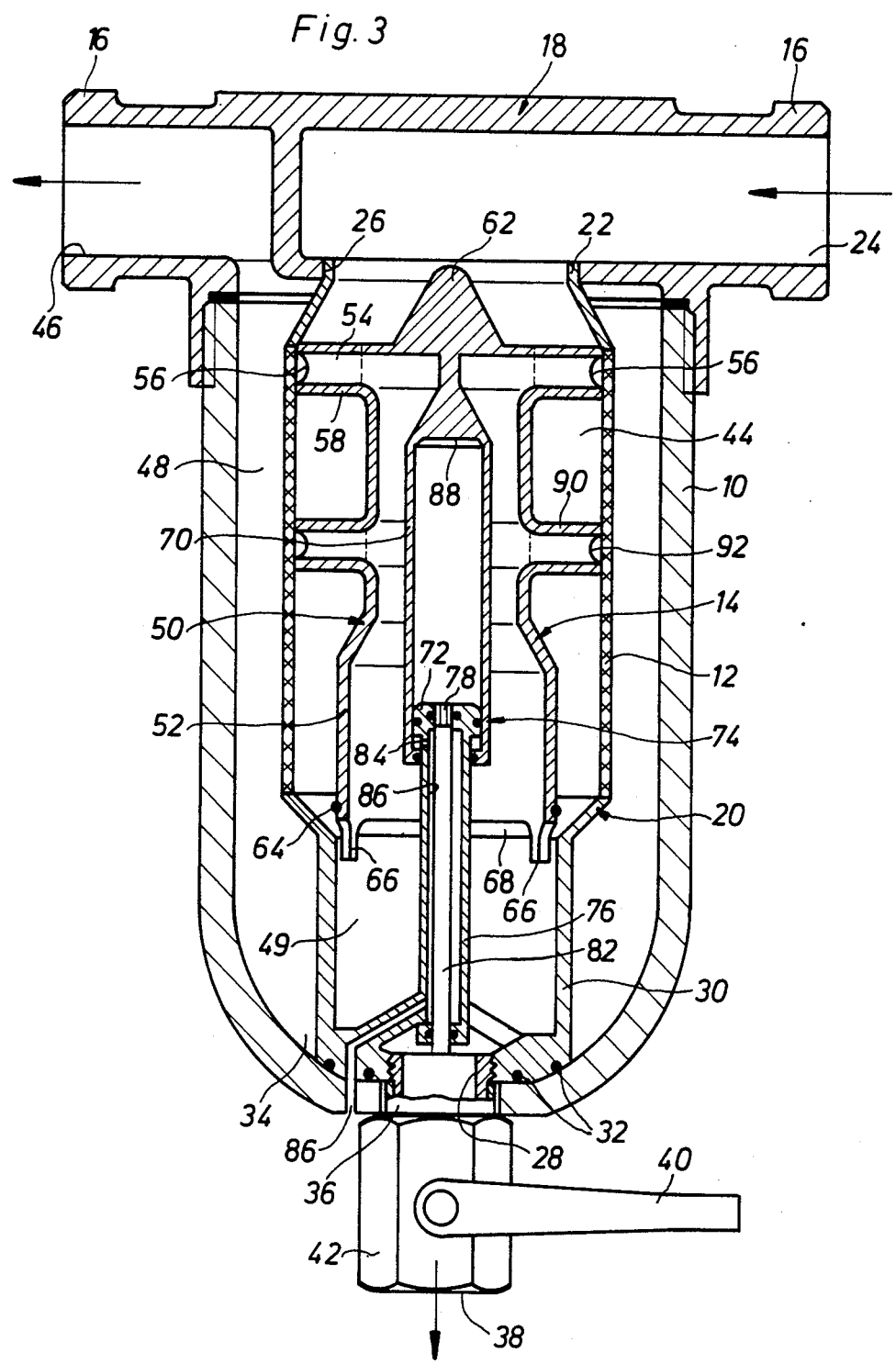

When shut-off 42 is closed, channel piece 50 is in the upper initial position illustrated in FIGS. 1 to 3. In this position the lower end of pipe 52, which carries a sealing ring 64, is completely withdrawn from hollow cylinder 30 except for downward projecting guide members 66. Water can thus flow from chamber 44 into chamber 49 through a toroidal gap 68. Coarser dirt particles can reach chamber 49 through this gap even during the filtering phase.

The reverse flow phase is initiated by opening shut-off 42. This causes the inlet, unfiltered water to flow through gap 48 into chamber 49 and rinses out the dirt particles which have accumulated in the chamber through the reverse flow channel.

Simultaneously, filtered water flows from chamber 48 through filter 12 to the peripheral opening 56 of toroidal channel 54, cleaning that particular part of the filter. This reverse flow water flows through channel piece 50 to chamber 49 and then flows through reverse flow outlet channel 39 which is under atmospheric pressure. Channel piece 50 is closed at the top and thus forms a piston unto whose effective piston surface a downward force is exerted by the difference in pressure between inlet 24 and the pressure in chamber 49 when shut-off 42 is open. Channel piece 50 moves slowly downward until sealing ring 64 seals chamber 49 from chamber 44. The downward force on the piston surface then increases due to an increased pressure difference, since chamber 49 is then only opened to atmospheric pressure and no more water flows through gap 68. This causes channel piece 50 to move downward at a higher speed until its lower end position is reached. At this time the whole inlet surface of the filter 12 has been passed over by opening 56 of toroidal channel 54 and thereby has been cleaned by reverse flow water.

The speed of movement of channel piece 50 is equalized and slowed up by a damper 74 consisting of a damping cylinder 70 and a damping piston 72. Damping cylinder 70 is coaxial to channel pice 50 and has a bottom opening, while piston 72 is fixed to the end of a piston rod 76 centrally mounted within hollow cylinder 30 and pointing upwards. The inside of cylinder 72 is connected to chamber 48 (FIG. 1) or chamber 49 (FIGS. 2 and 3) through a bore 78 in piston 72 and a bore 80 or line 82 in piston rod 76. During the reverse flow or cleaning phase, water from the inlet side still can pass through the free portion of filter 12 the filtered water side. The filtering operation is thus maintained during the cleaning process.

When, at the end of the cleaning process, shut-off 42 is closed, the pressure in chamber 49 again becomes the operating pressure, so that channel piece 50 will reach its initial position in the manner described below.

For the embodiment illustrated in FIG. 1, the movement back to the original position of channel piece 50 is accomplished by means of a helical spring (reset spring) 83 whose one end is fastened to a abutment of channel piece 50 and whose other end is supported by the bottom of hollow cylinder 30. The spring power available for resetting must be overcome by the pressure exerted on the piston surface of channel piece 50 during the cleaning process, so that reliable operation takes place only when the operating pressure exceeds a predetermined minimum pressure.

For the embodiments shown in FIGS. 2 and 3, the resetting takes place independently of the then present operating pressure. Here, resetting of channel piece 50 is accomplished by water from chamber 49 which is under operating pressure and which passes through line 82 and opening 78 to the inside of cylinder 70. In addition, a bore 86 is provided to allow a toroidal space 84 of cylinder 70 defined by the lower side of piston 72 and piston rod 76 to be constantly under atmospheric pressure.

While shut-off 42 is closed, channel piece 50 is held in its upper position through the pressure difference between the operating pressure in chamber 49 and atmospheric pressure in toroidal space 84. As soon as the cleaning process or phase is initiated by opening of shut-off 42, water flows out of cylinder 70 through opening 78 because of the pressure difference between inlet 24 and chamber 49. It flows through line 82 which opens into the reverse flow outlet channel, so that the channel piece moves downwards in a slow and uniform manner. The actual speed of movement is determined by the dimensions of the cross section of opening 78. When shut-off 42 is again closed, the pressure inside of the cylinder 70 again equalizes to the operating pressure, while atmospheric pressure is still present in toroidal space 84. This causes channel piece 50 to return slowly to its initial, upper position.

In the embodiment illustrated in FIG. 3, a second toroidal channel 90 having a peripheral opening 92 is provided at a predetermined distance below the upper toroidal channel 54. This allows a greater part of the surface of the filter to be cleaned for any one position of channel piece 50, thus allowing a decrease in the total travel of the latter without requiring an increase in the overall size of the apparatus.

Figure 4:
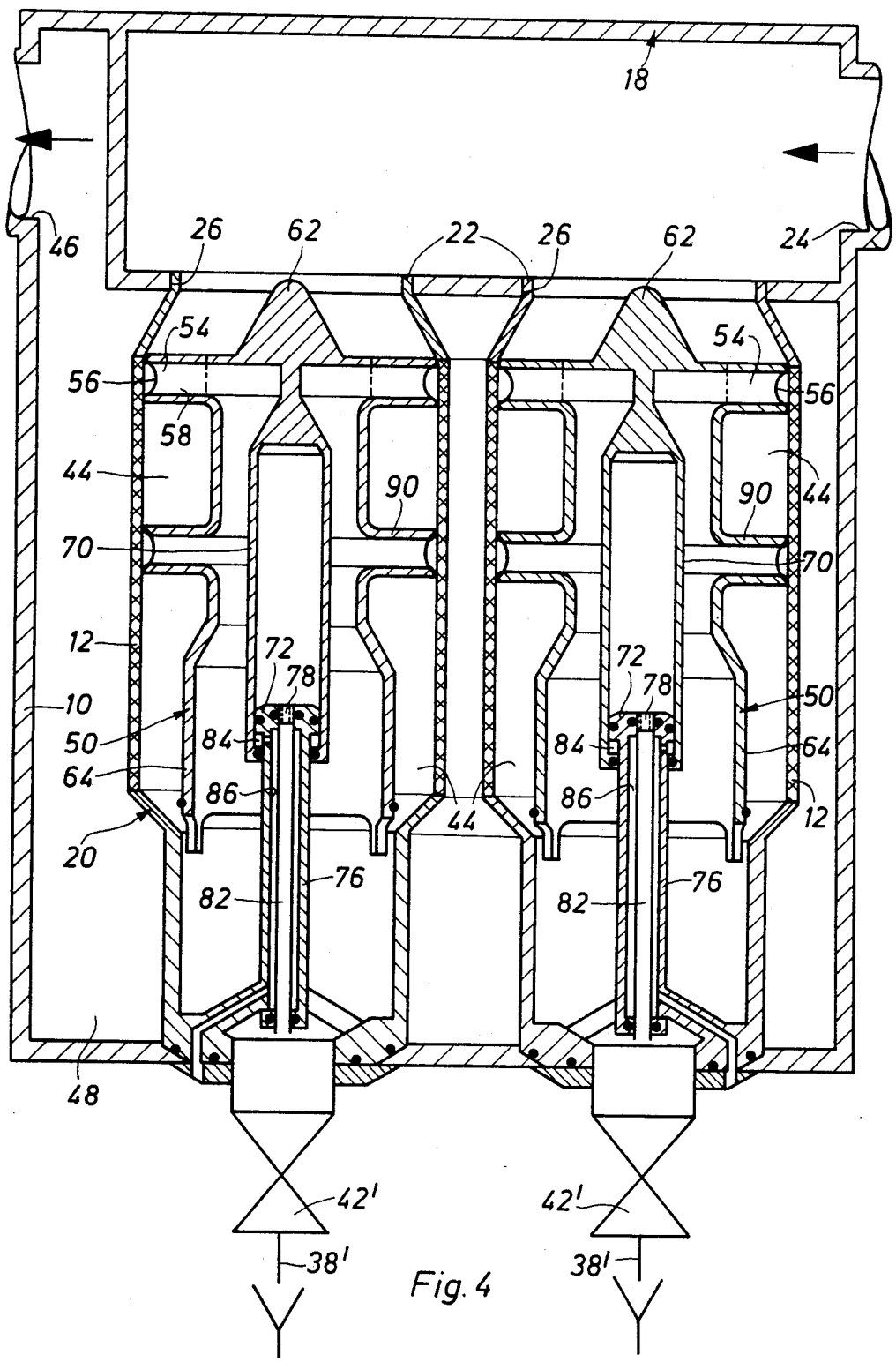
Figure 5:
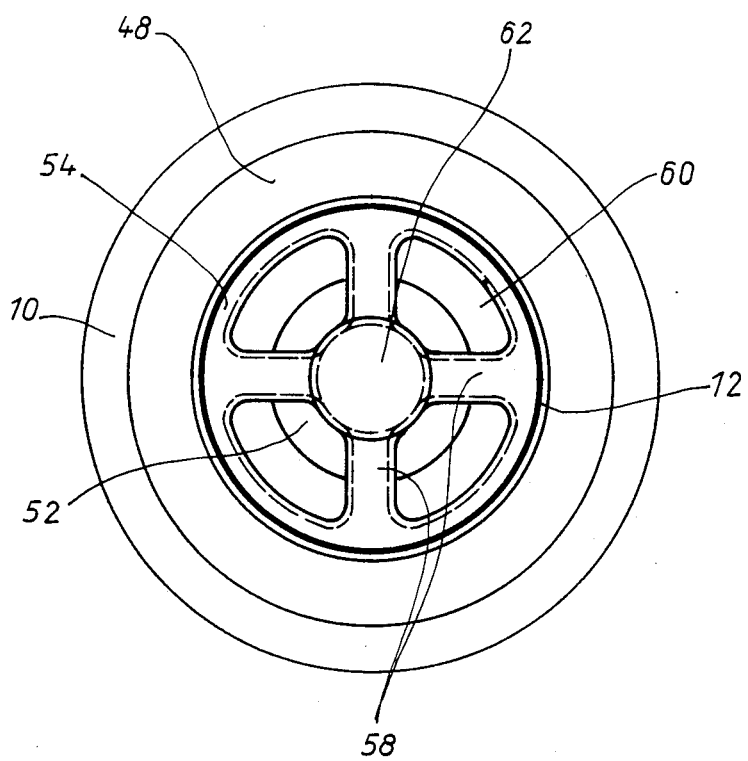
FIG. 5 is a top view of the filter cup of the embodiment of FIGS. 1-3, with the headpiece removed.

In the embodiment illustrated in FIG. 4, a plurality of filters 12, each with a channel piece 50, is arranged side by side to one another. Each is constructed in accordance with the embodiment illustrated in FIG. 3. A separate reverse flow channel 38 with a shut-off 42 is provided for each filter. Opening and closing of the associated shut-off 42 thus allows each filter to be cleaned independently of the others.

It is of course also possible to modify the embodiment of FIG. 4 so that all filters are connected to a common reverse flow outlet channel which, of course, must then have a correspondingly increased cross section. A single shut-off will then be required. For this embodiment, opening of the shut-off will cause all filters to be cleaned at the same time.

In the embodiments shown in FIGS. 6 to 9, filter 12 is fastened only to headpiece 18 in a kind of bayonet locking mechanism 102 and is additionally centered in a central opening 100 of the headpiece. Filter cup 10 is inserted in a threaded bore 104 of headpiece 18 which is also concentric to the other two openings.

Headpiece 18 further has a central opening 105 to which is fastened control apparatus 106 which initiates the sliding movement of channel piece 50.

Figure 6:
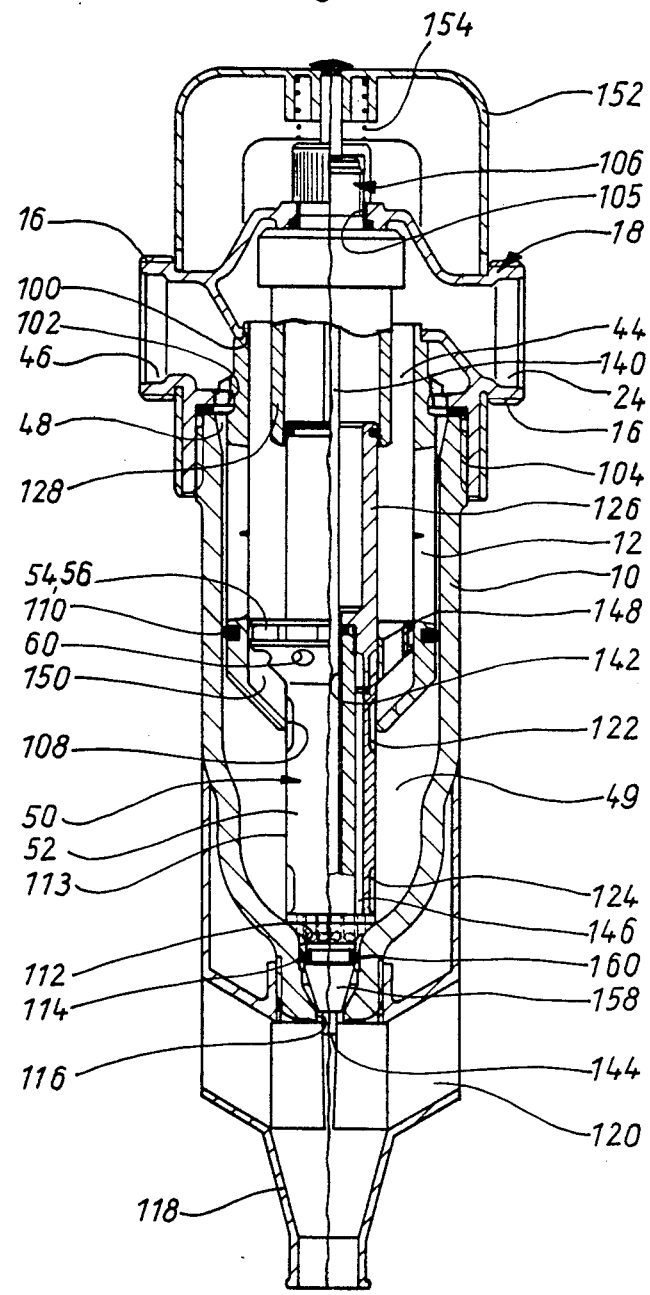
FIG. 6 is a vertical cross section of a further embodiment of a filter apparatus.
Figure 7:
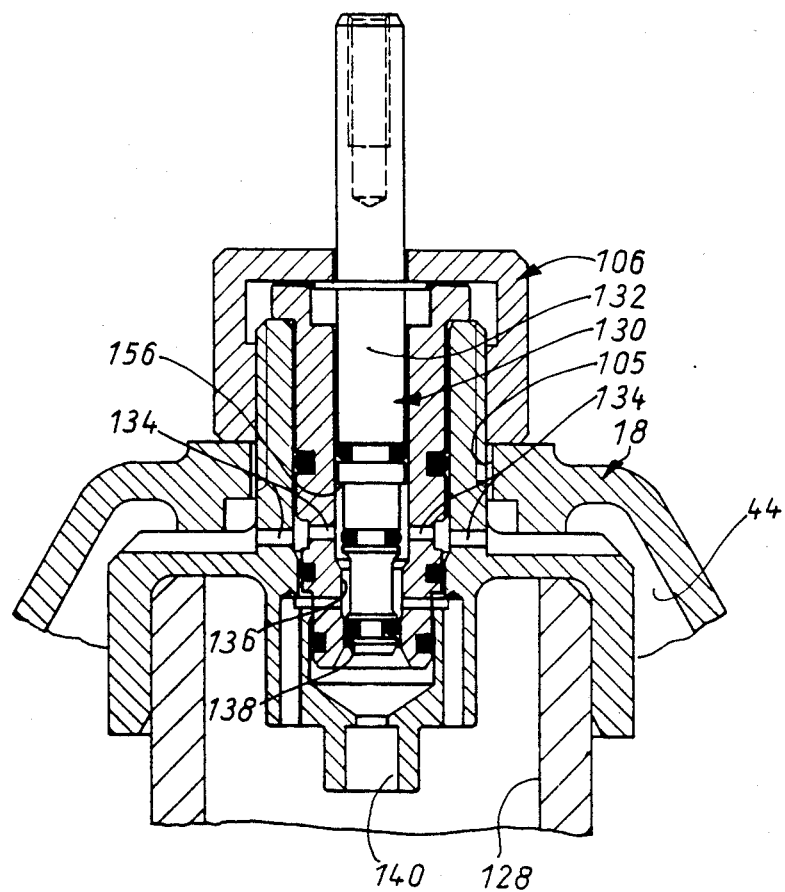
FIG. 7 is a cross section through the control valve of the filter apparatus of FIG. 6.

In the embodiment illustrated in FIGS. 6 and 7, filter 12 carries a sealing ring 110 which presses against the inner surface of filter cup 10. Pipe 52 of channel piece 50 points downward and passes through a central opening 108 of filter element 12. The lower end of the pipe carries a shut-off member 114 which may be introduced into a water-tight seat 112. Reverse flow chamber 49 is formed by the lower part of filter cup 10. Filter cup 10 has a reverse flow water outlet 116 which may be shut by shut-off member 114 and which leads to a nipple 118 which is screwed to the filter cup 10 from below. Nipple 18 is subjected to atmospheric pressure through a radial toroidal opening 120, thereby preventing the drawing in of dirty water into the filtering apparatus from a channel connected thereto.

Pipe 52, which enters into chamber 49, has slot shaped openings 122, 124 in its upper and lower parts. Coarser dirt particles can pass from chamber 44 into chamber 49 and thence to opening 116 through these slots, both when the shut-off is closed as illustrated in the figure, or when channel piece 50 is moved to its topmost position. In the intermediate region 123 between the upper and lower slots 122, 124, the pipe is sealed relative to central opening 108 of the filter. In its upper region, channel piece 50 has an axially projecting hollow piston 126, which projects into a control cylinder 128 of the hydraulic control apparatus 106. Control cylnder 128 is open towards the bottom.

As illustrated in FIG. 7, hydraulic control apparatus 106 consists of a 3/2 port valve 130 which is operable from the outside through a valve lifter 132. In the so called operating position of valve 130, which is illustrated in FIG. 7, control cylinder 128 is connected to chamber 44 through channels 134, thereby causing channel piece 50 to be retained with shut-off member 114 in water-tight seat 112 by the operating pressure existing in chamber 44. Seat 112 is in reverse flow water outlet 116.

Movement of valve lifter 132 from the operating position to the lower, so-called reverse flow position, causes the passage from chamber 44 to control cylinder 128 to be blocked in the region of valve seat 136, while an opening in the region of valve seat 138 creates a connection between control cylinder 128 and a centrally located, downward pointing pipe 140. Central pipe 140 passes in a water-tight manner through a central axial bore 142 in channel piece 50 and is open at its end 144 to nipple 118. In the reverse flow position, control cylinder 128 is thus discharged to atmospheric pressure.

Thus when valve 130 is moved from its operating position into the reverse flow position, channel piece 50 is moved upwards because of the pressure difference between chamber 49 and control cylinder 128, water being driven from control cylinder 128 through central pipe 140.

This causes shut-off 114 to move from seat 112, thereby opening outlet 116. In the first part of the cleaning phase, the coarse dirt which has accumulated in the lower part of the reverse flow chamber is flushed out. As channel piece 50 moves further upward, recesses 122 move out of the region of opening 108 so that pressure equalization can no longer take place between chamber 44 and chamber 49. In these intermediate positions, the places on filter element 12 which are opposite the toroidal openings are flushed from the outside towards the inside with clean water, the water flowing through axial bore 146 in pipe 52 to nipple 118. Simultaneously, the coarser dirt particles are scraped off the smooth filter surface by wipers 148 which contain toroidal channel 54. Wipers 148 are arranged in a diagonally upward position. The particles which are scrapped off the filter pass through openings 60 into the chamber below, namely chamber 150 of filter 12. In the upper end position, the lower recesses 124 are aligned with central opening 108, so that the particles which have gathered in chamber 150 are swept up by the downward flowing impure water and passed to outlet 116. Channel piece 50 moves towards an upper stop only as long as an operating member 152 which is connected to value lifter 132 is held down.

When operating member 152 is released, control valve 130 is again moved into its operating position by the force of reset spring 154 and the water pressure exerted against valve surface 156. In the operating position, control cylinder 128 is subjected to operating pressure from chamber 44. Channels 134 in control valve 130 exert a damping effect which prevents a sudden pressure equalization and causes channel piece 50 to return slowly to its lower end position. During this movement, the inner filter surface is again swept over and is cleaned of any remaining dirt. As outlet 116 closes, a slow decrease in the cross sectional area takes place in the region of conical throttle element 158, preventing the generation of fluid shocks during the closing process.

Shut-off member 114 has a sealing element consisting of a ring 160 which has an upward opening grove which allows the water pressure in chamber 49 to reinforce the sealing effect.

The valve in FIG. 6 is operated manually. It is of course possible to operate the valve automatically, for example by use of a solenoid.

Figure 8:
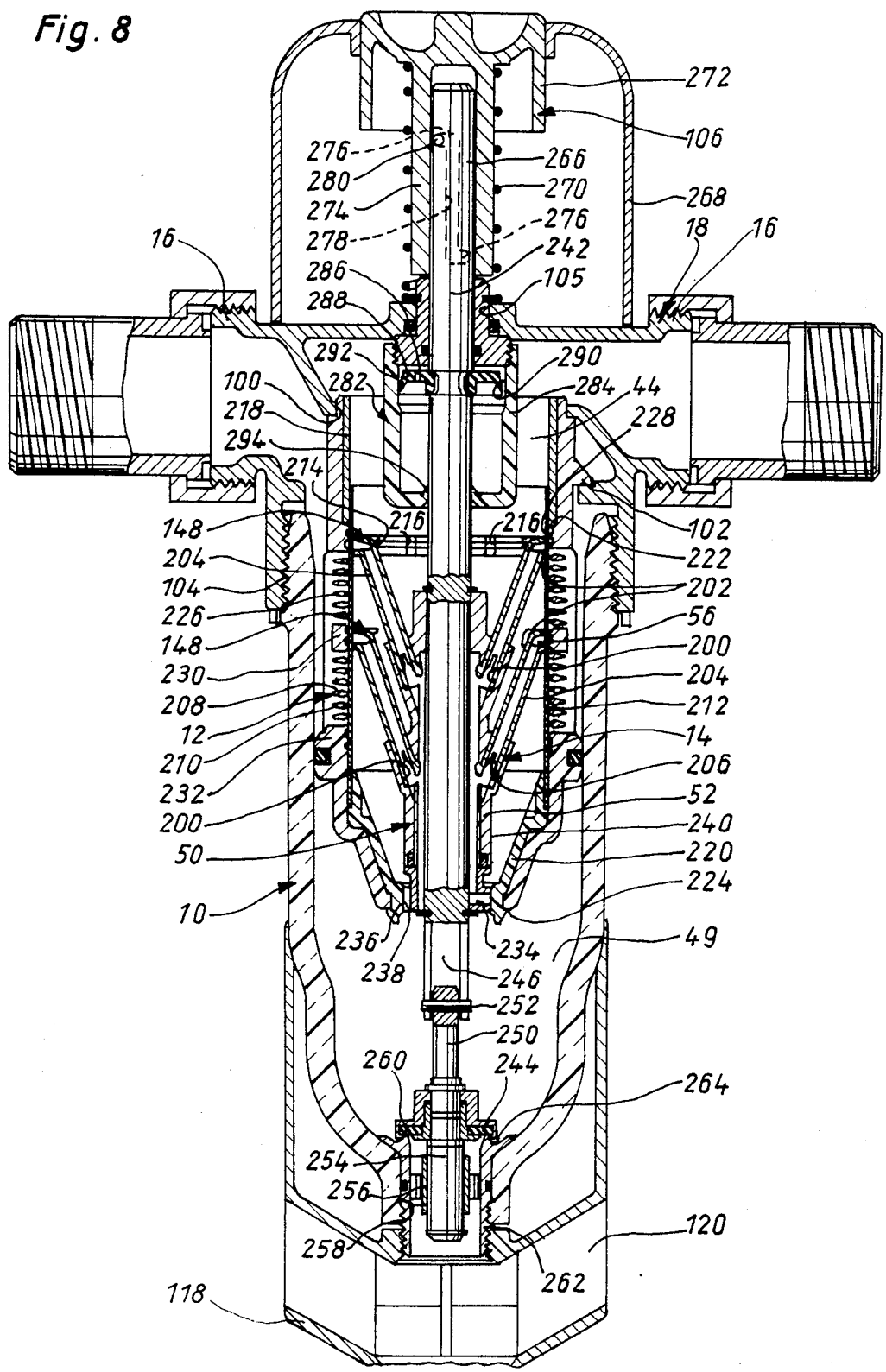
FIG. 8 is a vertical cross section of a further preferred embodiment of the present invention.
Figure 9:
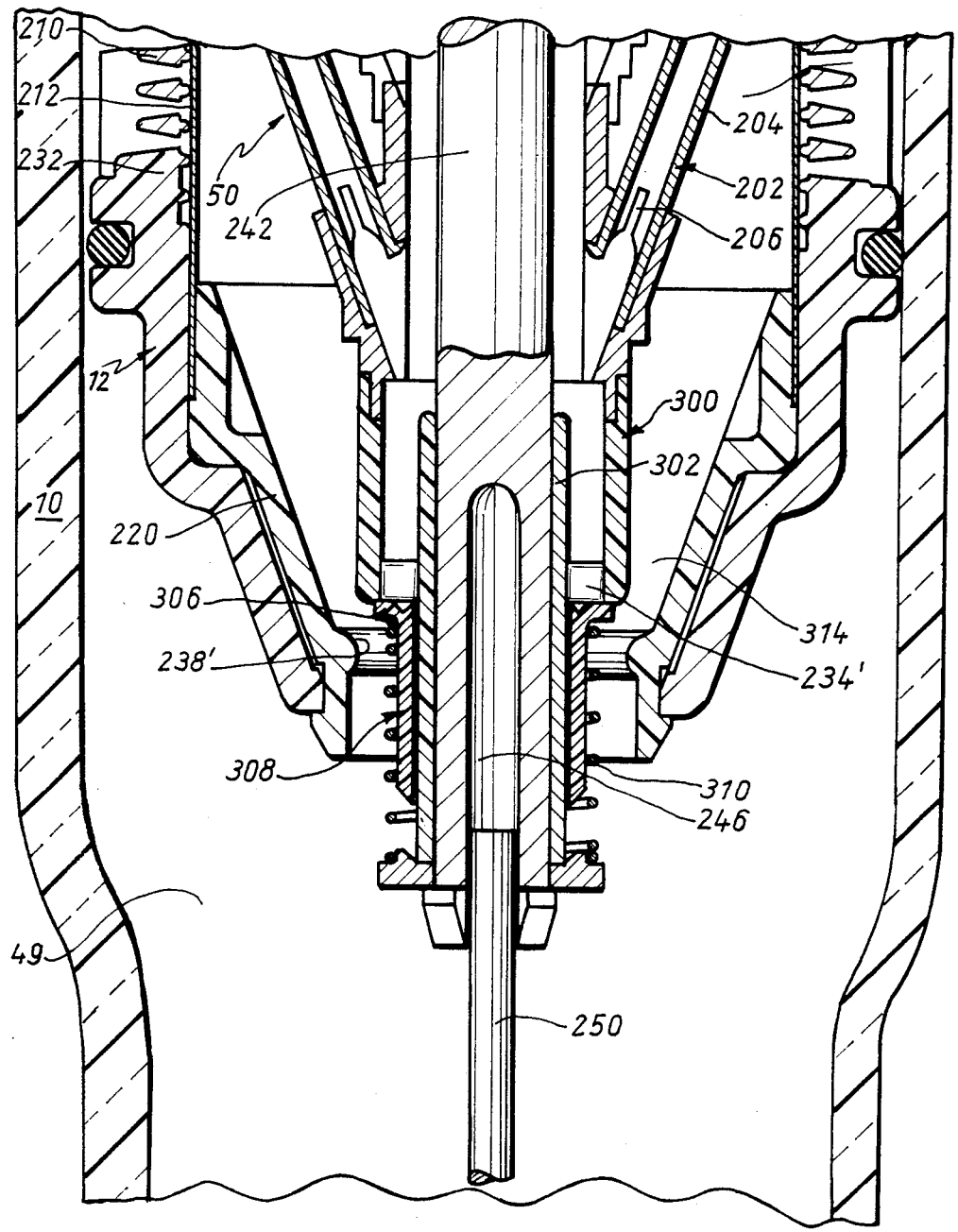
FIG. 9 is an enlarged cross section in the region of the outlet of the cleaning channel element of FIG. 8, with modified shut-off mechanism.

In the preferred embodiment illustrated in FIGS. 8 and 9, central pipe 52 of channel piece 50 has two rings each with six openings 200 into which the ends of individual wiper elements 202 are inserted, forming a water-tight seal. Wiper elements 202 together form a toroidal wiper 148. Flexing of the wiper element is facilitated by lengthwise slots 206. The edges of slot-shaped openings 56 of wiper elements 202 are pressed against the smooth inner surface of filter 212. Filter 212 in turn is stretched smoothly over the inside surface of a supporting member 210 which has through openings 208. Elements 202 have grooves 214 facing towards the inside and together forming an annular groove into which, if necessary, an expanding ring (not shown) may be inserted to increase the pressure exerted by wiper elements 202 against filter 212. Wiper elements 202 of each wiper 48 are spaced by small distances 216 from one another in the peripheral direction, thereby providing space for radial flexing. This compensates for manufacturing tolerances and for any unevenness on the surface of filter 212 resulting from dirt deposits.

Filter 212 is stretched between notched front faces 222, 224 of supporting member 210 by rings 218, 220 at its ends.

In this embodiment filter 212 is a webbed tube. Rings 218, 220 are provided at its ends and retain filter 212 in a stretched state between faces 222, 224 of supporting member 210. Contact with the filter is made by a helical supporting rib 226, so that wiper 148 contacts the filter with approximately the same pressure and therefore the same sliding fiction throughout its whole axial displacement, allowing a continuous movement. Rib 226 even extends into regions 228, 230, 232 of supporting member 210, namely the regions in which there are no through openings. These regions are designed to receive wipers 148 in their end position. The same sliding friction therefore exists in these regions also.

A plurality of radial openings 234 spaced at predetermined distances in the peripheral direction from one another are provided at the lower end of channel piece 50. In the position illustrated in FIG. 8, these are closed by a ring 236 on filter 12, thereby preventing the entrance of impure water. Downward through slots 238 are provided in channel piece 50 between openings 234. During filtering, dirt can pass through these from chamber 44 into chamber 49. As channel piece 50 moves downward during the reverse flow process, slots 238 are closed by a cylindrical surface 240 which extends into ring 236, while, at the same time, openings 234 leading to chamber 49 are opened. An actuating rod 242 is provided which extends in the upward direction over the filter housing. Rod 242 is connected to channel piece 50 to permit relative rotation, but not translation. A shutoff element 240 is mounted for axial movment relative to rod 242 by means of a peg 250 which extends into a hollow space 246 of rod 242. A pin 252 is provided to prevent relative rotation between shut-off element 244 and rod 242. Shut-off element 244 further has a threaded spindle which engages a threaded bushing 256, the latter being mounted in a metal pipe 262. Metal pipe 262 is non-rotatably mounted in an opening 258 in filter cup 10 and provides a water-tight seat 260 for shut-off element 244. This allows any shut-off forces which are applied to seat 260 to be completely absorbed by pipe 262 and therefore prevents their transmission to filter cup 10 which is made of a synthetic material. Opening and closing of shut-off element 244 is accomplished by turning of rod 242 and is therefore independent of the sliding motion of the actuating rod during the reverse flow process. In the closed condition, the shut-off force of shut-off element 244 is increased by the pressure within the filter housing, while opening of the element is facilitated by a channel 264 which reverses the flow of the cleaning water, and deflects it upward toward element 244. The end of actuating rod 242 projecting over the filter housing is designated by reference numeral 266. It extends into an extension 268 of the housing and is provided with an actuating knob 272 whose downward movement is opposed by the force of a spring 270. Actuating knob 272 allows actuating rod 242 to be rotated, thereby effecting opening and closing of shut-off element 242, and to be moved in the axial direction, thereby causing axial translation of channel piece 50. Knob 272 has a shaft 274 with two lengthwise slots 278 each having an upper and a lower locking recess 276. A guide and locking pin 280 projects radially on both sides from the actuating rod and engages slots 278. This constitutes the mechanism allowing lowering of knob 272.

Damper apparatus 282 is provided to cause the movement of channel piece 50 and wiper 148 to be a slow, even movement during the reverse flow process. The damper apparatus consists of a damping cylinder 264 fixedly arranged within chamber 44. Rod 242 passes through cylinder 284. A damping piston 288 having an opening 286 is arranged on rod 242 within cylinder 284. Cylinder 284 has an increased cross section 290 in its upper region, thereby preventing the introduction of additional friction at the start of movement, since at that time the static friction between wiper 148 and filter 12 must be overcome.

Piston 288 is provided with a downward facing annular water-tight lip 292 which increases the throttling effect when pushed down. Further, the lower through opening in the cylinder provided for actuating rod 242 is bounded by a water-tight lip 294 which prevents an exchange of water with that in chamber 44 while actuating rod 242 is pushed downwards, but not while the rod is being raised.

In the embodiment illustrated in FIG. 9, the outlet from channel piece 50 is constituted by an axially downward facing ring-shaped opening 234' arranged in a double walled extension 300 of channel piece 50. An inner pipe 302, attached to actuating rod 242, extends through and downwardly below extension 300. Inner pipe 302 carries a shut-off member 308 having a toroidal shut-off element 306 for axial movement therewith.

As long as only a small or no pressure difference exists between chamber 49 and the inside of channel piece 50, shut-off element 306 is pushed against the rim of opening 234' by the force exerted by reset spring 310. This prevents the entry of unfiltered water, and thus of dirt particles, from chamber 44 or 49 into channel piece 50. On the other hand, chamber 44 is connected to chamber 49 through annular opening 238', so that the coarser dirt particles can fall down into chamber 49 during the filtering operation. When, at the start of the reverse flow phase, activating rod 242 is rotated, lifting shut-off element 244 from its seat 260, the unfiltered water and the accumulated coarse dirt particles are rinsed out of chamber 49 by unfiltered water streaming through opening 238'. As long as opening 238' remains open, opening 234' remains closed. When, subsequently, actuating rod 242 with channel piece 50 is pushed downward so that the outer pipe 312 of extension 300 enters into opening 238' and blocks this against further entry of water from chamber 44, a pressure difference builds up between the inside of channel piece 500 and chamber 49. This pressure difference acts opposite the force exerted by reset spring 310 to lift shut-off element 306 from opening 234' and allows the reverse flow water carrying the finer dirt removed from the filter element to flow from channel piece 50 through chamber 49 to outlet nipple 118. In this phase, the dirt removed from the surface of filter 212 by wiper elements 202 is collected in a conical annular space 314 of filter element 12 until such time as opening 238' is again freed by lifting of actuating rod 242. Immediately thereafter, shut-off element 306 is returned to its upper closed position by the force of reset spring 310. Thus the dirt that has been collected in a space 314 during the reverse flow process is carried away to the outlet nipple by unfiltered water streaming into chamber 49. This takes place without entry of any dirt particles into channel piece 50.

While the invention has been illustrated in preferred embodiments, it is not to be limited to the circuits and structures shown, since many variations thereof will be evident to one skilled in the art and are intended to be encompassed in the present invention as set forth in the following claims.

We claim:

1. Filter apparatus with reverse flow cleaning, comprising,
    unfiltered liquid inlet means receiving liquid under operating pressure;
    a first chamber connected to said unfiltered liquid inlet means;
    filtered liquid outlet means;
    a second chamber connected to said filtered liquid outlet means;
    filter means separating said first from said second chamber, said filter means having a first surface having a predetermined surface area exposed to unfiltered liquid and a second surface forming part of said second chamber, and including hollow cylindrical filter support means having a predetermined diameter and a hollow cylindrical filter supported thereby, said first and second chamber being, respectively, internal and external to said hollow cylindrical filter, whereby dirt particles collect on said first surface as a liquid flows from said first to said second chamber;
    reverse flow means comprising reverse flow outlet means, externally operable reverse flow shut-off means having a first position allowing a reverse flow through said reverse flow outlet means and a second position stopping said reverse flow, and a reverse flow chamber adjoining said first chamber and connecting to said reverse flow outlet means;
    channel means comprising reverse flow inlet means positioned adjacent to said first surface of said filter means to receive liquid flowing through said filter means from said second to said first chamber,
    means interconnecting said reverse flow inlet means to said reverse flow chamber, said reverse flow chamber being internal to said hollow cylindrical filter support, said interconnecting means including a channel pipe having a diameter slightly smaller than the predetermined diameter of said hollow cylindrical filter support means, and a closed top for receiving said force created by said pressure difference, said channel pipe moving from said first to said reverse flow chamber as said inlet means moves from said first to said second position,
    movement of said reverse flow shut-off means from said second to said first position creating a pressure difference causing a reverse flow from said second chamber through said filter means to said reverse flow inlet means, said pressure difference further creating a force acting on said reverse flow inlet means to move said reverse flow inlet means from a first end position over said first surface of said filter means to a second end position;
    reset means moving said reverse flow inlet means back to said first end position following movement of said reverse flow shut-off means back to said second position, and
    means for increasing said pressure difference after said reverse flow inlet means has moved from said first end position.

2. Apparatus as set forth in claim 1, wherein said reset means comprises a spring.

3. Apparatus as set forth in claim 1, wherein said liquid is water.

4. Apparatus as set forth in claim 1, wherein said reverse flow inlet means comprises a toroidal channel open to said first surface of said filter means and a plurality of radial channels placed at predetermined angular distances from one another for connecting said toroidal channel to said channel pipe, whereby said channel pipe moves with said reverse flow inlet means, spaces between said radial channels allowing flow of said unfiltered water from said unfiltered water inlet means to said first chamber.

5. Apparatus as set forth in claim 4, wherein unfiltered liquid flows from said first chamber to said reverse flow chamber while said reverse flow inlet means is at said first end position;

further comprising sealing means carried by said channel pipe for preventing said flow of said liquid after said reverse flow inlet means has moved from said first end position, thereby increasing said pressure difference.

6. Apparatus as set forth in claim 1, further comprising damping means for damping the movement of said reverse flow inlet means from said first to said second end position.

7. Apparatus as set forth in claim 6, wherein said damping means comprises a damping cylinder having an internal volume, a damping piston inside said damping cylinder, said damping piston having a through opening opening into said internal volume, and a hollow piston rod for allowing water flow from second chamber to said internal volume of said damping cylinder.

8. Apparatus as set forth in claim 1, wherein said filter means comprises hollow cylindrical filter means having an inside surface constituting said first surface and an outside surface constituting said second surface;

wherein said reverse flow inlet means comprises wiping means having an end-portion, and a slot-shaped peripheral opening radially pressed in water-tight contact against said inside surface of said filter; and wherein said interconnecting means comprises a hollow channel pipe having at least one peripheral opening retaining said end portion of said wiper means, a closed top for receiving a force created by said pressure difference, and an open bottom terminating in said reverse flow chamber.

9. Apparatus as set forth in claim 8, further comprising a headpiece carrying said liquid under operating pressure, said headpiece having a first opening and a second opening concentric to said first opening, bayonet locking means locking said filter means into said first opening of said headpiece, and control means for initiating said force moving said reverse flow inlet means.

10. Apparatus as set forth in claim 9, wherein said channel pipe in said hollow cylindrical filter element mounted for axial movement with respect thereto, said channel pipe having at least one slot respectively in the upper and lower parts thereof, allowing passage of water and dirt particles from said first chamber to said reverse flow chamber;

further comprising filter cup means fastened to said headpiece coaxially with said first and second openings for containing said first and second chambers and said reverse flow chamber, water-tight seating means fastened to said filter cup means internally thereto, shut-off means carried by said channel pipe means at the lower extremity thereof and adapted to form a water-tight seal in conjunction with said water-tight seating means;

and wherein said externally operable reverse flow shut-off means comprises control means moving said shut-off means relative to said water-tight seating means.

11. Apparatus as set forth in claim 10, wherein said channel pipe means has an upper end;

wherein said control means comprise hollow control cylinder means controlling the pressure on said channel pipe at said upper end, valve means having an operating position allowing liquid flow from said first chamber to said hollow control cylinder means and a reverse flow position blocking said passage and applying atmospheric pressure to said hollow control cylinder means, and externally operable valve lifter means for initiating movement of said valve means from said operating to said reverse flow position.

12. Filter apparatus with reverse flow cleaning comprising, unfiltered liquid inlet means receiving liquid under operating pressure;

a first chamber connected to said unfiltered liquid inlet means;

filtered liquid outlet means;

a second chamber connected to said filtered liquid outlet means;

filter means separating said first from said second chamber, said filter means comprising a substantially cylindrical supporting body having an inner and an outer surface, and through openings, and a filter element smoothly stretched over said inner surface of said supporting body;

reverse flow means comprising reverse flow outlet means, externally operable reverse flow shut-off means having a first position allowing a reverse flow through said reverse flow outlet means and a second position stopping said reverse flow, and a reverse flow chamber adjoining said first chamber and connecting to said reverse flow outlet means;

channel means comprising at least one wiper element having edges defining a slot-shaped peripheral opening elastically and liquid-tightly pressed against said filter element, and axially movable means mechanically coupled to said wiper element for hydraulically coupling said peripheral opening to said reverse flow chamber, axial movement of said hydraulic coupling means moving said wiper element and said peripheral opening of said wiper element over substantially all surface of said filter element; and means for creatng said axial movement of said hydraulic coupling means relative to said filter element, whereby said filter element is cleaned by a combined wiping and reverse flow process.

13. Apparatus as set forth in claim 12, wherein said wiping means comprises a plurality of wiper elements arranged at predetermined angular distances from one another each having a slot-shaped opening, said slot-shaped openings of said wiper elements together constituting said slot-shaped peripheral opening.

14. Apparatus as set forth in claim 12, wherein said filter means comprises a support member having a helical supporting rib, and a webbed tube constituting a filter smoothly stretched over said supporting rib.

15. Apparatus as set forth in claim 14, wherein said supporting means is a supporting cylinder external to said filter, having an operating cylinder part having a plurality of through openings, and a solid end portion, said supporting rib extending over said solid end portion and said operating cylinder part.

16. Apparatus as set forth in claim 12, wherein unfiltered liquid flows from said first chamber to said reverse flow chamber while said reverse flow inlet means is at said first end position;

further comprising sealing means for preventing said flow of said liquid after said reverse flow inlet means has moved from said first end position.

17. Apparatus as set forth in claim 12, further comprising means blocking the flow of liquid between said reverse flow chamber and said interconnecting means while said reverse flow inlet means is in said first end position.

18. Apparatus as set forth in claim 13, wherein said first surface of said filter means has a first and second axial portion; and wherein said wiping means comprises two sets of wiper elements axially spaced from one another, each set for wiping a corresponding one of said axial portions of said first surface.

19. Apparatus as set forth in claim 13, wherein each of said wiper elements further comprises an internal groove, said grooves together constituting an internal circular groove; further comprising an expansion ring in said groove for bending said elements outwards toward said first surface of said filter means.

* * * * *